United States Patent [19]

Riess

[11] 3,938,093
[45] Feb. 10, 1976

[54] COIN OPERATED TERMINAL
[75] Inventor: Joseph A. Riess, Dayton, Ohio
[73] Assignee: Quote, Inc., Dayton, Ohio
[22] Filed: July 2, 1974
[21] Appl. No.: 485,097

[52] U.S. Cl. .......................... 340/152 R; 340/149 R
[51] Int. Cl.² ......................................... H04Q 5/00
[58] Field of Search ....................... 178/5.6, DIG. 9; 340/152 R, 162, 149 A, 172.5

[56] References Cited
UNITED STATES PATENTS

| | | | |
|---|---|---|---|
| 3,511,351 | 5/1970 | Jones | 340/162 X |
| 3,818,187 | 6/1974 | Lovendusky | 340/149 A |

Primary Examiner—Harold I. Pitts
Attorney, Agent, or Firm—Dybvig & Dybvig

[57] ABSTRACT

Solid state circuitry for a coin operated terminal adapted to be located remotely from a data base is described. The circuitry includes timing devices for limiting the duration during which the terminal can be used upon receipt of a coin and for returning a coin to the customer in the event no data is received from the data base.

The terminal is provided with a communications modem and interrogator for accessing the data base. During the interval in which communications is being initiated, the terminal keyboard is locked out of operation so that the customers cannot accidentally disrupt or scramble the interrogator signals.

7 Claims, 4 Drawing Figures

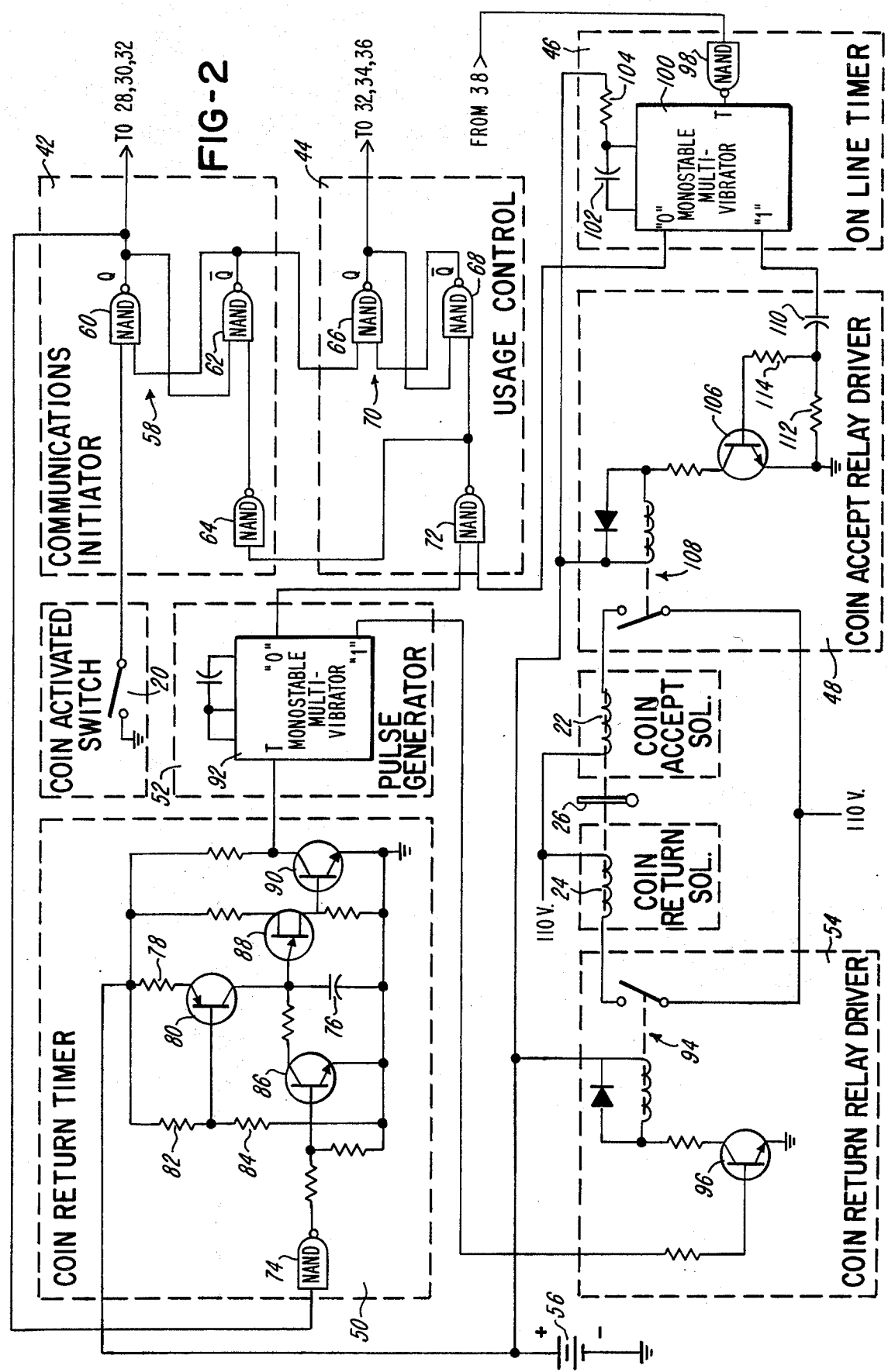

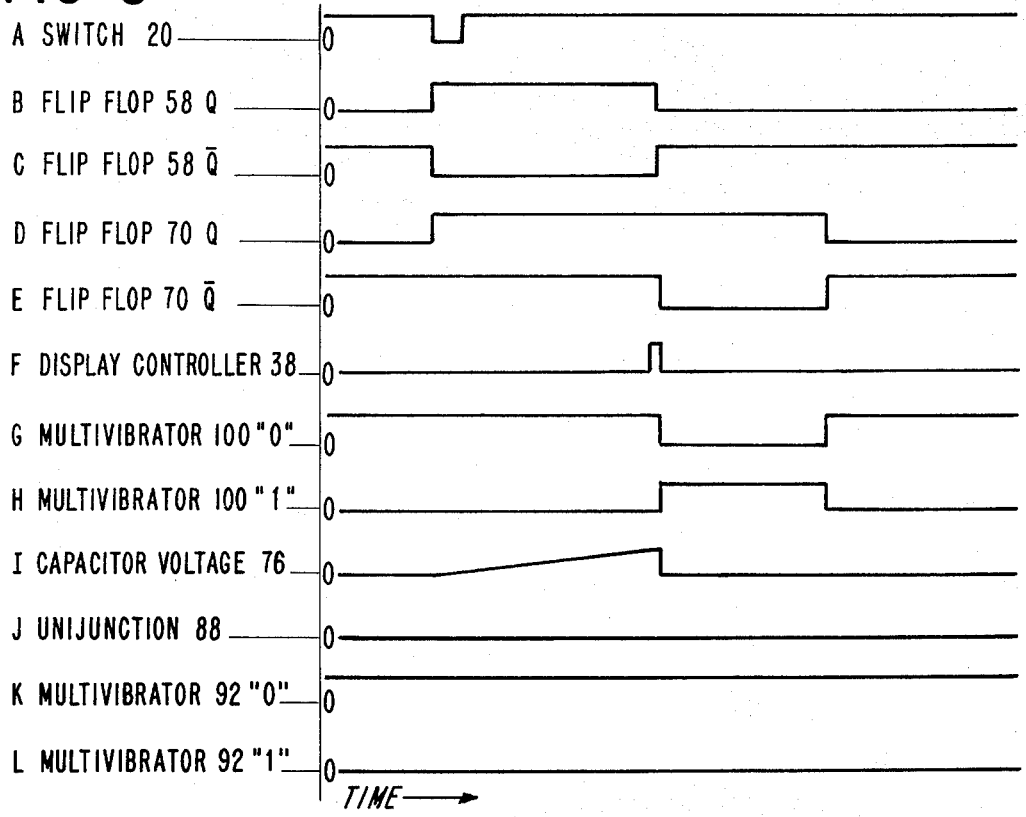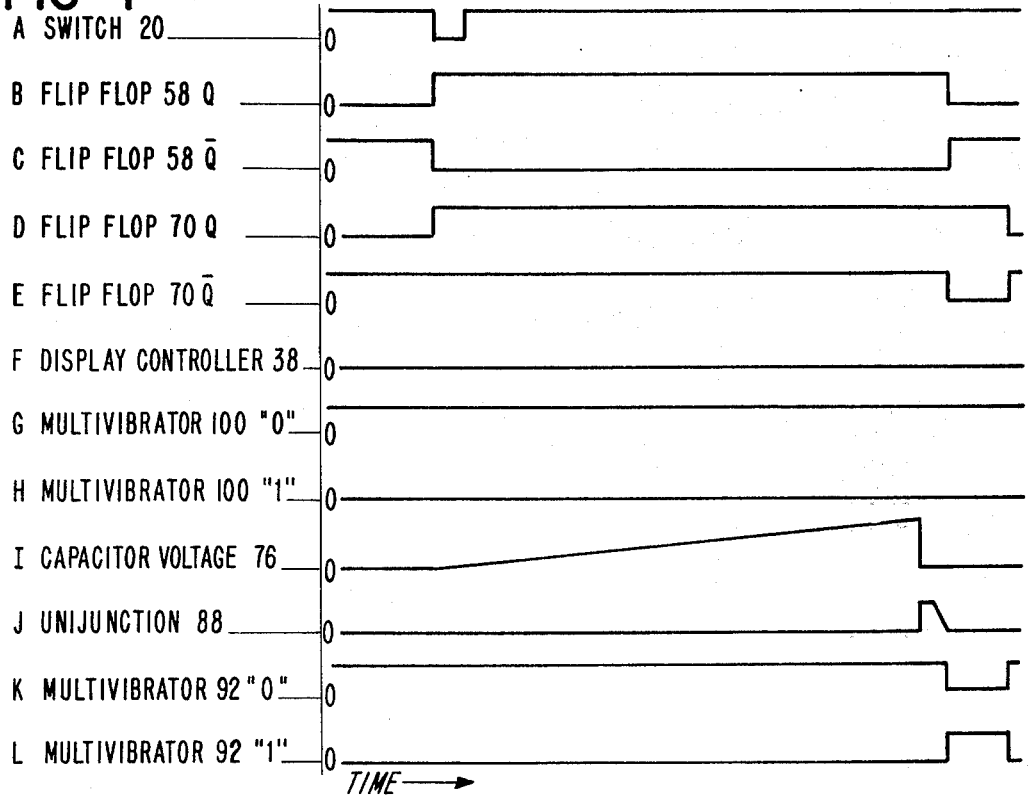

COIN OPERATED TERMINAL

BACKGROUND OF THE INVENTION

This invention relates to computer terminals and more particularly to the provision of a terminal having access to a remote data processor over communication lines which the general public may use by actuating with coins, checks or the like.

Although many systems have been devised for utilizing a central data processor with remotely located terminals connected through communication lines or the like, I am unaware of any prior terminal wherein members of the general public can obtain access to computerized information through the use of a coin or check controlled terminal. There are numerous types of information which could be stored in a computer and accessed to advantage by the general public. As examples, such information could include updated stock market prices, weather reports, costs and features of various goods and services, and sports information. Data bases are in existence, such as for stock market information, but prior to this invention the information was made available only to those who purchased or had leased terminals. U.S. Pat. Nos. 3,652,795, 3,656,148 and 3,716,835 are exemplary of the more typical systems.

SUMMARY OF THE INVENTION

This invention provides a terminal which a member of the general public can utilize for a limited period of time. The preferred form of the invention utilizes a conventional coin accepter. When a proper coin is inserted into the accepter, the terminal is energized to initiate communication with a remote or central computer or data processor. When a response is first received from the data processor, a timer is energized which maintains the terminal operative and on line with the processor. When the timer times out, communication with the data processor is discontinued. During the interval in which the terminal is on line with the processor, a customer may, using the terminal keyboard, request information from the processor and the processor responses are displayed in any suitable fashion. Preferably the display would be in the form of a cathode ray tube. However, other types of displays could be utilized. Because access to the processor may occasionally be unobtainable, such as would be the case if there is a failure in the communication lines or if the processor is down or otherwise unavailable, a timer located at the terminal is provided to energize a device which, in the case of a coin operated terminal, would return the coin to the customer. This timer is energized when the coin is first inserted in the coin accepter and remains energized until it either times out and thus causes the coin to be returned or until the coin is accepted. The coin is accepted in the event communication is established with the data processor. At the same time the coin return timer is disabled.

Further in accordance with this invention, the terminal preferably has a standard communication modem for encoding and decoding information transmitted between the terminal and the computer or data base. Codes are inserted into the terminal by a standard keyboard. When a terminal is first activated, an interrogator device is energized. As conventional, the interrogator device has a preset code transmitted to the remote computer. During the interval in which the terminal itself is generating a code, the keyboard in accordance with this invention is locked out of operation so that there will be no confusion in the code. As understood by those skilled in the art, the code generated by the terminal functions to signal the computer to start communicating and to identify the particular terminal which is being used.

The terminal control circuitry including the aforementioned timers may be used with terminals without coin accepters or the like. In general the timing circuitry can be incorporated in terminals which are to be used for a predetermined limited period of time following each activation thereof.

BRIEF DESCRIPTION OF THE DRAWINGS

FIG. 2 is a portion of the circuitry illustrated in block form in FIG. 1 and particularly the terminal controller circuitry which interconnects the coin accepter with the terminal communications and display circuits.

FIGS. 3 and 4 are sets of curves useful in understanding this invention.

DESCRIPTION OF THE PREFERRED EMBODIMENT

Figure 1:
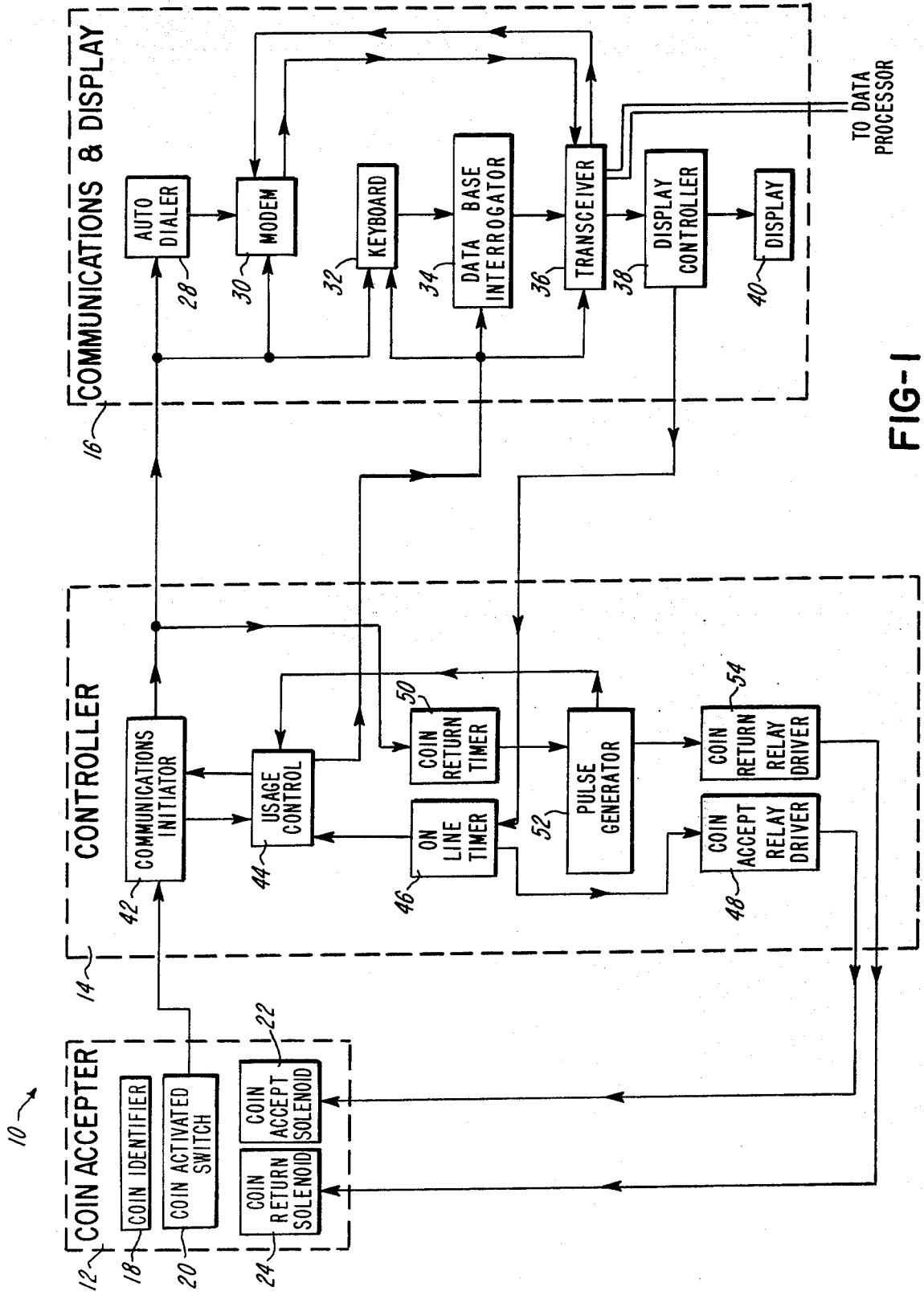
FIG. 1 is a block diagram of the apparatus of this invention.

FIG. 1 illustrates a block diagram of a complete terminal assembly generally designated 10 made in accordance with this invention. The terminal assembly 10 may include a housing (not shown) for a coin accepter generally designated 12, terminal controller circuitry generally designated 14, and terminal communications and display circuitry generally designated 16. The mechanical construction and physical appearance of the terminal 10 are unimportant to this invention. The terminal, for example, could have an appearance quite similar to the desk unit 20 shown in FIG. 1 of above mentioned U.S. Pat. No. 3,656,148.

The coin accepter 12 as diagrammed in FIG. 1 preferably includes a coin identifier 18 which senses the presence of a proper coin and which, if such coin is sensed, permits the coin to mechanically activate a switch 20. The coin accepter 12 further includes a first solenoid 22 energized upon receipt of information by the terminal 10 described below, causing the coin to be deposited in a box (not shown). A second solenoid 24 is energized in the event the coin is to be returned as also will be described below. With reference to FIG. 2, the solenoids 22 and 24 may be mechanically connected to a plate or the like device 26 which, as those familiar with coin accepters will understand, is used to direct a coin to either a return chute (not shown) or to the coin deposit box.

Here it should be noted that the presently preferred embodiment of the invention contemplates the use of a conventional coin accepter 12. Obviously other coin or check controlled devices could be used. For example, a card identifier could be used in lieu of the coin accepter 12 which would be actuated by insertion of a credit card or the like into a slot. In such case the switch 20 would be replaced by a suitable electronic switch energized upon receipt of verification of the credit card identity. Also in such case the solenoids 22 and 24 would be replaced by circuitry which would transmit data to a central location for accounting purposes. Since credit card systems of this type are known, none is described in detail herein.

The terminal communications and display circuitry 16 may be entirely conventional and thus are not described in detail herein. As illustrated in FIG. 1, the communications and display circuitry 16 may include an automatic telephone dialer 28, a communication modem 30, a keyboard 32, a data base interrogator 34, a transceiver 36, a display control 38 and a display 40. The automatic dialer 28 is utilized if needed to dial the remote telephone exchange at which the data processor or computer (not shown) is located. Of course, if the terminal 10 is hard wired to the remote unit, an auto dialer would not be needed.

Modem 30 is used to convert signals sent to the remote data processor to signals capable of transmission over telephone lines and is also used to convert incoming signals to signals usable in the terminal 10. The keyboard 32 includes touch keys or the like for encoding into the terminal 10 the nature of the information requested. For example, if this invention were used in a stock market information retrieval system, the keyboard 32 could be used to encode the identity of various stocks.

The data base interrogator 34 converts signals received from the keyboard 32 to signals of a character recognized by the remote data processor. Interrogator 34 may also be used to produce coded signals which identify the particular terminal 10 that is being used. Signals generated or converted by interrogator 34 are transmitted to the data processor by the transceiver 36 which, as diagrammatically illustrated in FIG. 1, is connected to modem 30 so that the signals are compatible with telephone line transmission. Here it may be noted that the modem 30 may be completely standard or it could be specially designed depending upon the modem used at the data processor. Also it may be noted that the system with which the terminal 10 is usable need not be dependent upon telephone line transmission; other forms of communication could be used.

The display controller 38 is triggered into operation upon receipt of signals by the transceiver 36 from the remote data processor. Display controller 38 may include, for example, banks of shift registers (not shown) for controlling the display 40. The display 40 may take any convenient form such as an array of incandescent readout devices, a cathode ray tube, or a printer.

In accordance with this invention, the controller circuitry 14 provides timing functions especially designed to enable operation of the communication and display circuitry 16 under control of the coin acceptor 12. With reference to FIG. 1, the controller 14 includes circuits identified as a communications initiator circuit 42, a usage control circuit 44, an on-line timer 46, a coin accept relay driver 48 triggered by the timer 46, a coin return timer 50, a pulse generator 52 and a coin return relay driver 54.

The coin accept relay driver 48 and the coin return relay 54 are connected to the coin accept solenoid 22 and the coin return solenoid 24, respectively, these items being connected to a common 110 volt line. As will be described below, the coin accept relay driver 48 energizes the coin accept solenoid 22 when a signal is first received from the remote data processor. The coin return solenoid 24 is energized by its driver 54 in the event no information is received from the data processor within a predetermined time interval. The coin accepter 12 is otherwise connected to the terminal controller 14 by line connection between the coin activated switch 20 in the accepter 12 and the communications initiator circuit 42 in the controller circuitry 14. All other elements of the controller circuitry 14 are interconnected and/or connected to the communications and display circuitry as will now be described in connection with both FIGS. 1 and 2.

As illustrated in FIG. 2, all of the DC components of terminal 10 may be energized from a common power supply 56. When a coin is first sensed by the switch 20, the switch 20 is closed to provide a path to ground. The switch 20 is only momentarily closed so that a momentary negative signal is created in the circuit line between the switch 20 and the initiator 42.

The initiator 42 includes a $\overline{RS}$ flip-flop generally designated 58 consisting of a first NAND gate 60 and a second NAND gate 62, each having an input terminal tied to the output terminal of the other. Switch 20 is directly connected to a second input terminal of the first NAND gate 60 and a third NAND gate 64, wired as an inverter, is connected to a second input terminal of the second gate 62. A NAND gate is a commercially available logic circuit element well known in the art which requires a high or logic 1 signal on each of the input terminals to produce a low or logic 0 signal upon the output terminal thereof. Following conventional practice, the output of the flip-flop 58 appearing at the output of the first NAND gate 60 is identified by the symbol "Q", and the output appearing at the second NAND gate 62 is identified by the symbol "$\overline{Q}$". This circuitry 42 is referred to as a communications initiator because the output Q, upon receipt of the signal resulting from momentary closure of switch 20, goes from the low logic state to the high logic state and remains at the high logic state until communications are established with the remote data processor at which time it returns to the low logic state. Since the output Q is connected to the dialer 28 and the modem 30, both the dialer 28 and the modem 30 are energized when the output Q of the flip-flop 58 rises to the high logic state.

Although the output Q of flip-flop 58 is connected to the keyboard 32, it does not energize the keyboard 32 when it rises to the high logic state. Rather, the connection of the output of the first NAND gate 60 to the keyboard 32 is an inverse type of connection wherein the keyboard 32 is rendered inoperative while the output Q is at the high logic state. Such may be accomplished, for example, by triggering an NPN transistor (not shown) at the input to the keyboard 32 which would ground the base of another NPN transistor (not shown) connected in series between the keyboard and its power source, thereby making the keyboard inoperative. As will become apparent, the locking out of the keyboard is a temporary condition which is removed when communication is first established with the remote data processor. The locking out of the keyboard 32 is preferred during the period in which communication with the data processor is being initiated because operation of the keyboard during this interval may interfere with the establishment of communications.

The output $\overline{Q}$ of the second NAND gate 62 is connected to an input terminal of a fourth NAND gate 66 which is connected with a fifth NAND gate 68 to form a second $\overline{RS}$ flip-flop generally designated 70. The other input terminal of the fifth NAND gate 68 is connected to the output terminal of a sixth NAND gate 72. As described below, the sixth NAND gate 72 is controlled by the on-line timer 46 and the coin return timer 50.

Usage control 44 is so named because the output Q of the second flip-flop 70 rises to its high logic state when switch 20 is first closed and remains in the high logic state until communication with the data processor is interrupted, as will be described below, or until the coin which closed switch 20 is returned as will also be described below. Flip-flop 70 output Q is connected to the keyboard 32, the data base interrogator 34, and the transceiver 36 to render all of these circuits energized or operative throughout the entire usage period. Although the keyboard 32 is energized, it is temporarily rendered inoperative as discussed above during the interval in which communication with the data processor is being initiated.

Closure of switch 20 also energizes the coin return timer 50 because, as illustrated, the output Q of the first flip-flop 58 is connected to the coin return timer 50. More particularly, as illustrated in FIG. 2, the output of the first NAND gate 60 appears at the input to a seventh NAND gate 74 wired as an inverter. NAND gate 74 is the input to a timing circuit including a timing capacitor 76 and a timing resistor 78. The capacitor 76 and the resistor 78 are connected in series with a PNP transistor 80 biased by resistors 82 and 84 to be conductive at all times. The PNP transistor 80 is used, as conventional, to cause the capacitor 76 to charge at a nearly linear rate. Except when the input to the seventh NAND gate 74 is at a high logic state, the base of a control transistor (NPN) 86 is at a high potential. The control transistor 86 is thus conductive and provides a short path to ground around the timing capacitor 76, preventing it from charging. When the output Q of the first flip-flop 58 rises to its high logic state, the output of the inverter NAND gate 74 is triggered to a low logic state whereupon the control transistor 86 is rendered non-conductive and the timing capacitor 76 begins to charge at a rate controlled by the timing resistor 78 and the PNP transistor 80.

The timing components 76, 78 and 80 are connected in series to the emitter of a unijunction transistor 88. If the timing capacitor 76 is permitted to charge to a potential sufficient to cause the unijunction transistor 88 to become conductive, the capacitor 76 will then discharge through the unijunction transistor 88. A positive signal is then generated which is directly coupled to the base of yet another NPN transistor 90, the collector of which is connected to the input of a monostable multivibrator 92 that forms part of the pulse generator 52. As illustrated in FIG. 2, the monostable multivibrator 92 is circuit connected as a pulse generator and functions simply to convert the abrupt output signal of the unijunction transistor 88 to a usable width pulse. The monostable multivibrator 92 has two output terminals. The output terminal which goes to 0 or low logic state is connected to one of the input terminals of the sixth NAND gate 72. The output terminal which goes to the 1 or high logic state is connected to the input of the coin return relay driver 54.

With continued reference to FIG. 2, the return relay driver 54 includes a relay 94 having normally open contacts. Relay 94 is energized to cause its contacts to close when an NPN transistor 96 becomes conductive to provide a path to ground through the coil of relay 94. As apparent, the transistor 96 becomes conductive when its base is placed at a high potential as a result of the aforedescribed operation of the monostable multivibrator 92. Closure of the contacts of relay 94 closes the circuit for the coin return solenoid 24, thereby causing the coin to be returned.

The values of the timing capacitor 76 and the timing resistor 78 are so selected that ample time will be provided for communication to be established between the terminal 10 and the remote data processor prior to energization of the coin return solenoid 24. In the event communication is established, a pulse or signal is promptly generated by the display controller 38 through the output thereof which is connected to the on-line timer 46. As conventional, the signal generated by the display controller 38 may be triggered upon receipt of the first data by a shift register forming part of the display controller 38. With reference to the lower right hand portion of FIG. 2, this signal appears at the input terminal of an eighth NAND gate 98 wired as an inverter, the output terminal of which is connected to the input terminal of a second monostable multivibrator 100 to which a timing capacitor 102 and a timing resistor 104 are connected. The signal received by the eighth NAND gate 98 from the display controller 38 is a positive going signal converted by the NAND gate 98 to a negative going signal. The monostable multivibrator 100 is selected to be of a type which is triggered by the positive going edge of a negative pulse. Therefore, as soon as the trailing edge of the signal is received from the output of the NAND gate 98, the low output terminal of the second monostable multivibrator 100 is triggered to its logic 0 or low state. This output terminal of the monostable multivibrator 100 is connected to an input terminal of the sixth NAND gate 72. The other output terminal of the monostable multivibrator 100 is connected to the coin accept relay driver 48. The latter output terminal is raised to its logic 1 or high state upon receipt of a pulse from the eighth NAND gate 98. Accordingly, the base of an NPN transistor 106 is raised to a positive potential rendering the transistor 106 conductive to provide a path to ground for the coil of a relay 108 having normally open contacts which are closed to energize the coin accept solenoid 22. As will be described below, the pulsing of the monostable multivibrator 100 forming part of the on-line timer 46 also causes the control transistor 86 to become conductive thereby resulting in discharge of the timing capacitor 76. The control transistor 86 remains conductive until the end of the operation of the terminal. Therefore, the coin return solenoid 24 will not be operated after communication has been established with the remote data processor and the coin accept solenoid 22 has been energized.

With continued reference to the on-line timer 46 depicted in FIG. 2, the timing capacitor 102 and the timing resistor 104 are connected to the monostable multivibrator 100 in a manner well known in the art to provide a predetermined time interval following receipt of the pulse from the display controller 38 during which its 0 output and its 1 output remain at the low and high logic states, respectively. After such predetermined time interval, the output terminals of the monostable multivibrator 100 reverse their logic states and again, as later described, the terminal 10 will be turned off.

Because the 1 output terminal of the monostable multivibrator 100 remains at its high logic state for an extended time interval, and because it would be undesirable to maintain conduction through the coil of the relay 108 for that time interval, the signal appearing at the input of the accept relay driver 48 is differentiated by a capacitor 110 and resistors 112 and 114 whereupon the coil of relay 108 is energized by only a momentary pulse.

With reference to FIGS. 1, 2 and 3, the normal operation of the terminal 10 is as follows. When a proper coin is inserted in the coin accepter 12, a negative going pulse shown in curve 3A is generated by closure of switch 20. Therefore, the input to the first NAND gate 60 from switch 20 goes to its 0 or low logic state. Inasmuch as the output of a NAND gate is invariably at 1 or its high state when either input is at the 0 or low state, the output Q of the NAND gate 60 is triggered to its high state upon closure of switch 20 as is illustrated in curve 3B.

At this time both input terminals of the second NAND gate 62 are at their high logic state and the output $\overline{Q}$ thereof is at 0 (curve 3C). One of the input terminals of the NAND gate 62 is at its high state because it is connected to the output terminal of the first NAND gate 60. The other input terminal to the second NAND gate 62 is at its high state because the 0 output of both monostable multivibrators 92 and 100 are at their high states since neither monostable has received a signal. Accordingly, the output of the sixth NAND gate 72 is at 0 and this output is inverted by the third NAND gate 64. As already discussed, when the output Q of the first flip-flop 58 first rises to its high logic state, the dialer 28 and the modem 30 are energized to initiate communication with the remote data processor and the keyboard is temporarily locked out of operation.

When the output $\overline{Q}$ of the first flip-flop 58 drops to its low state, the output Q of the second flip-flop 70 is thereby driven to its high state (curve 3D) and the keyboard 32, the data interrogator 34 and the transceiver 36 are thereby energized.

Simultaneously with the aforedescribed triggering of the communications and display circuit components, the appearance of a positive going pulse from the output Q of the first flip-flop 58 at the input to the seventh NAND gate 74 in the coin return timer circuitry 50 initiates the timing operation described above which, if not interrupted by a shorting of the capacitor 76 by the transistor 86, will ultimately result in triggering of the unijunction transistor 88. However, in normal operation, as illustrated in curve 3F, communication is established with a remote data processor and the aforementioned positive going pulse is generated by the display controller 38, which is inverted by the eighth NAND gate 98 to a negative going pulse applied to the input of the monostable multivibrator 100 in the on-line timer 46. The 0 output thereof is triggered to its low logic state by the trailing or positive going edge of the negative going pulse received from the output of the eighth NAND gate 98 as shown in curve 3G. This is accompanied as shown in curve 3H by a simultaneous rise in the output of the 1 terminal to its high logic state which, as already described above, causes energization of the coin accept solenoid 22 under control of the coin accept relay driver 48.

The dropping of the 0 terminal output of the on-line monostable multivibrator 100 causes the output of the sixth NAND gate 72 of the usage control circuitry 44 to go to its high logic state. This output is inverted by the third NAND gate 64 in the communication initiator network 42 which, in accordance with NAND gate operation, results in the output $\overline{Q}$ of the first $\overline{RS}$ flip-flop 58 to rise to its high logic state. As soon as the output $\overline{Q}$ rises to its high logic state and the switch 20 remains open, these elements being the inputs to the first NAND gate 60, the output Q of the first $\overline{RS}$ flip-flop 58 drops to logic 0 as indicated in curve 3B. The effect of the dropping of the output Q of the first $\overline{RS}$ flip-flop 58 to logic 0 upon the communications and display circuitry 16 is to unlock the keyboard 32. The same event could discontinue operation of the dialer 28 but dialers conventionally include circuitry for automatically discontinuing the dialer operation when communication is established. The operation of the modem 30 is unaffected because modems are designed to remain operable when communication is established.

The dropping of the output Q of the first flip-flop 58 to logic 0 also causes the interruption of the coin return timer 50. This is because the input to the seventh NAND gate 74 drops to a low logic state whereupon its output goes high. The control transistor 86 is thereby rendered conductive and the timing capacitor 76 discharges through the control transistor 86 before becoming charged to a level at which operation of the unijunction 88 would be triggered. Therefore, curve 3I illustrates the voltage on the capacitor 76 dropping abruptly to logic 0 when the 0 output terminal of the monostable multivibrator 100 drops to logic 0. For this reason, curve 3J shows that the unijunction transistor 88 never varies from its logic 0 state and curves 3K and 3L illustrate that the 0 output terminal of the coin return monostable multivibrator 92 remains at its high logic level whereas its 1 output terminal remains at its low level.

When communication is established, the user of the terminal may now encode information by use of the keyboard 32 and obtain information from the remote data processor during the predetermined time interval in which the 0 output terminal of the on-line monostable multivibrator 100 remains at its low logic level. As noted above, this predetermined time interval is determined in part by the values of the timing capacitor 102 and the timing resistor 104. As soon as the on-line timer 46 has timed out, the 0 output terminal of the monostable multivibrator 100 rises to its high logic state. Accordingly, the output of the sixth NAND gate 72 in the usage control circuitry 44 drops to logic 0. The output $\overline{Q}$ of the second flip-flop 70 rises to its high state and its output Q drops to 0. The transceiver 36 is thereby de-energized, interrupting communication with the data processor. The keyboard 32 and the data base interrogator 34 are also de-energized. As conventional, modem 30 is self de-energized when communication is interrupted.

The curves of FIG. 4 illustrate the operation of the terminal 10 in the event of failure to establish communication with the remote data processor for an extended period of time. Such event may result, for example, from busy telephone circuits or the data processor is unable to accept any inquiry for any reason, a disruption of the communication lines, or malfunctioning of parts of the terminal communications and display circuitry 16. Curve 4A is identical to curve 3A and again represents the negative going pulse generated by closure of the switch 20 when a proper coin is inserted in the coin accepter 12. The initial portions of curves 4B, C, D and E are identical to curves 3B, C, D and E because precisely the same events will occur at the flip-flops 58 and 70 when switch 20 is closed. Thereafter the curves differ because no signal is received by the on-line timer monostable multivibrator 100 from the display controller 38. Accordingly, curves 4F, 4G and 4H are straight lines.

Under the conditions illustrated in FIG. 4, the capacitor 76 as shown in curve 4I continues to charge until its charge is sufficient to trigger the operation of the unijunction transistor 88 as shown in curve 4J. (Those familiar with unijunction transistors will realize that the pulse width shown in curve 4J has been exaggerated for purposes of illustration.) As previously described, the pulse generated by the unijunction transistor 88, which is inverted and amplified by the transistor 90, appears at the input of the pulse generator monostable multivibrator 92. Therefore, its 1 output terminal rises to its high logic state and the coin return relay driver 54 is energized to cause the coin return solenoid 24 to operate whereupon the coin is returned to the customer.

The signal appearing at the input terminal of the pulse generator monostable multivibrator 92 also causes its 0 output terminal to drop to its low logic state. Accordingly, the output terminal of the sixth NAND gate 72 in the usage control circuit 44 rises to its high logic state with the result that the output Q of the second flip-flop 70 drops to its low logic state for the same reasons discussed above. The dialer 28, modem 30 and transceiver 36 are thus turned off and further effort at communication with the data processor is discontinued.

As shown in the right side of FIG. 4, the condition of both outputs of the first flip-flop 58 is changed upon the leading edge of the pulse generated by the output terminal 0 of the pulse generator monostable multivibrator 92. The same is true of the output $\overline{Q}$ of the second flip-flop 70. This result is obtained because the first flip-flop 58 is directly controlled by the output of the sixth NAND gate 72 in the usage control circuitry 44. For the same reason, the output $\overline{Q}$ of the fifth NAND gate 68 forming part of the second flip-flop 70 drops to 0 but, since this output is applied to the input of the fourth NAND gate 66, its output Q will momentarily remain at its high state until the trailing edge of the 0 terminal pulse of the monostable multivibrator 92 goes positive.

From the foregoing description it is seen that a terminal is provided suitable for coin operation using standard, inexpensive circuit components and a coin return is provided in the event of malfunction or the failure to function. Integrated circuit components are readily adapted to the circuitry described above. For example, dual monostable multivibrator devices are available so that one integrated circuit chip can be used to provide both of the elements 92 and 100. Part No. MC667 marketed by Motorola Semiconductor Products, Inc. of Phoenix, Ariz., is an example of such a chip. Motorola Part No. MC672 is a device consisting of four 2-input NAND gates. Two such devices could be used to provide the eight NAND gates.

It is contemplated that the coin return timer would time out in a inquiries. of minutes, typically on the order of three minutes, so that customers would not be unduly delayed while awaiting the establishment of communications with a remote data processor. In some systems, such as hard wired systems, where establishment of communications with a data processor could be expected within a few seconds, the coin return timer would preferably be designed to time out within, say, a minute. The on-line timer 46 would permit communication between the terminal 10 and the remote data processor for so long as may be economically feasible considering the value of the coin or coins, or checks, used. Experience with one system indicates that terminal on-line time of 30 to 45 seconds is satisfactory for obtaining computer responses to three or four inquires.

Certain of the signals produced by the circuit component may readily be adapted to perform functions in addition to those described above. For example, the positive going signal generated at the output Q of the first flip-flop 58 could be used to energize other displays which could indicate mode of operation, notify the user that an effort is being made to reach the remote data processor, or the like. Any of the signals generated as a result of triggering by the signal received from the display controller 38 shown in curve 3F could be used to cause the display 40 or some other display (not shown) to indicate that communication has been established.

Although the presently preferred embodiment of this invention has been described, it will be understood that within the purview of this invention various changes may be made within the scope of the appended claims.

Having thus described my invention, I claim:

1. A terminal adapted for communication with a remote data processor comprising
   terminal communication means including a transceiver and a modem for communicating with the data processor,
   display circuit means for displaying information received from the data processor,
   switch means,
   and controller circuit means,
   said controller circuit means including communication initiator means responsive to said switch means energizing said terminal communication means and said display circuit means to initiate communication with said data processor,
   first timer means energized upon actuation of said switch means and de-energized upon receipt of communications from the data processor for de-energizing said terminal communication and display circuit means in the event communication with said data processor is not initiated within a predetermined time interval,
   on-line timer means energized upon receipt of communication from said data processor,
   and means responsive to said on-line timer means when said timer means times out to discontinue communication with said data processor.

2. The terminal of claim 1 wherein said switch means is coin or other check controlled.

3. The terminal of claim 1 wherein said switch means is coin controlled and said controller circuit means further includes coin return driver means energized when said first timer means times out, and circuit means for de-energizing said first timer means upon receipt of communication from said data processor whereby said coin return driver means is not energized in the event communication with said data processor is established.

4. The terminal of claim 1 further including a manually operable keyboard for encoding information for transmission to said data processor and electric circuit means connecting said on-line timer means to said keyboard for preventing operation of said keyboard except during the interval during which communications with said data processor is established.

5. In a system for enabling members of the general public to receive information from a remote data processor, terminal means having communications means including a transceiver and a modem for communicating with the remote data processor, display means for displaying information received from the data processor, accepter means including switch means actuated upon detection of a coin or other check, circuit means energized by actuation of said switch means for initiating operation of said transceiver means and said modem, means for detecting receipt of information from the remote data processor and controlling the operation of said communications means to limit the information receivable by said terminal means upon each actuation of said switch means.

6. The system of claim 5 wherein said means detecting receipt of information comprises timer means energized upon first receipt of communication from the data processor for discontinuing communication with the data processor following a predetermined time interval.

7. The system of claim 5 wherein the terminal means further includes a manually operable keyboard for encoding information for transmission to the data processor, electric circuit means connecting said keyboard to said means for detecting receipt of information and preventing operation of said keyboard except during the intervals in which communications is established with the data processor.

* * * * *

UNITED STATES PATENT OFFICE
CERTIFICATE OF CORRECTION

PATENT NO. : 3,938,093
DATED : February 10, 1976
INVENTOR(S) : Joseph A. Riess

It is certified that error appears in the above-identified patent and that said Letters Patent are hereby corrected as shown below:

Column 9, line 57, "inquiries." should be ---matter---.
Column 10, line 3, "inquires" should be ---inquiries---.
Column 10, lines 4 & 5, "component" should be ---components---.

Signed and Sealed this fourth Day of May 1976

[SEAL]

Attest:

RUTH C. MASON
*Attesting Officer*

C. MARSHALL DANN
*Commissioner of Patents and Trademarks*